(12) United States Patent
Moore et al.

(10) Patent No.: US 9,984,040 B2
(45) Date of Patent: May 29, 2018

(54) EVOLVED TRANSFORM FOR PROCESSING DATA

(71) Applicant: University of Alaska Anchorage, Anchorage, AK (US)

(72) Inventors: Frank W. Moore, Anchorage, AK (US); Brendan J. Babb, Anchorage, AK (US)

(73) Assignee: University of Alaska Anchorage, Anchorage, AK (US)

(*) Notice: Subject to any disclaimer, the term of this patent is extended or adjusted under 35 U.S.C. 154(b) by 250 days.

(21) Appl. No.: 14/630,705

(22) Filed: Feb. 25, 2015

(65) Prior Publication Data

US 2015/0242364 A1    Aug. 27, 2015

Related U.S. Application Data

(60) Provisional application No. 61/944,241, filed on Feb. 25, 2014.

(51) Int. Cl.
*G06F 17/10* (2006.01)
*G06F 17/14* (2006.01)

(52) U.S. Cl.
CPC ............ *G06F 17/14* (2013.01); *G06F 17/148* (2013.01)

(58) Field of Classification Search
None
See application file for complete search history.

(56) References Cited

U.S. PATENT DOCUMENTS

| 6,266,414 B1 * | 7/2001 | Bradley | G06T 9/007 380/240 |
| 2002/0015531 A1 * | 2/2002 | Chui | G06F 17/148 382/240 |

* cited by examiner

*Primary Examiner* — Michael D. Yaary
(74) *Attorney, Agent, or Firm* — Ballard Spahr LLP (57) ABSTRACT

Methods and systems for processing data are disclosed. An example method can comprise receiving first data. The method can comprise applying a first transform to the first data. The first transform can be evolved from a second transform. The first transform can be based on first coefficients and the second transform can be based on second coefficients. The first transform can be evolved without constraining a count of the first coefficients to be equal to a count of the second coefficients. The method can comprise providing the transformed first data.

20 Claims, 6 Drawing Sheets

Hi_R Level 1 = {-0.000598598, -0.000441951, -0.002050814, 0.000436, -0.002792908, 0.003611588,
   0.009283345, -0.009670574, -0.474861904, 0.475658044, 0.008207292, -0.007145383,
   -0.003666858, 0.002362624, 0.000377896, 0.002511746, 9.76E-05, 0.000541322}
Lo_R Level 1 = {-5.71E-05, -0.000739544, -0.000949116, -0.000405299, -0.000930109, 0.004026393,
   0.109917879, -0.15390341, -1.000449466, -0.999096622, -0.149763904, 0.113388637,
   0.003544242, -0.002209612, -0.000652358, -0.000896239, -0.000807269, -0.000303922}
Hi_R Level 2 = {0.000265217, -0.00017684, 0.000531911, -0.000396928, 0.000176112, -0.000333352,
   0.001421773, 0.008725819, -0.505343322, 0.504362311, -0.005355593, -0.002052904,
   4.69E-05, -0.00043299, -6.14E-05, 0.000144157, 0.000143574, 0.00023221}
Lo_R Level 2 = {0.000294018, -0.000143187, -7.63E-05, 0.00052591, -0.00043387, -0.002318175,
   0.126944386, -0.108976887, -0.980510273, -0.983964964, -0.111040497, 0.129573025
   -0.000984368, -0.00022656, 0.000245082, -0.000119224, 0.000137638, 0.000202429}
Hi_R Level 3 = {0.00029166, 5.25E-05, 0.000482568, -4.82E-05, 0.000349576, -6.81E-05,
   0.001097964, -0.000442975, -0.499451872, 0.498588687, 0.001517705, -0.000828283,
   8.16E-05, -4.45E-05, 0.000297283, -0.000160529, 0.000208908, -0.000116179}
Lo_R Level 3 = {0.000181673, -0.000107216, -3.52E-05, 0.000177562, -0.000446426, 0.000199914,
   0.126283993, -0.121289494, -0.992633028, -0.994693, -0.124521506, 0.125410528,
   0.000321614, -9.67E-05, 0.000314759, -0.000178123, 0.000280024, 0.000351148}
Hi_R Level 4 = {0.000149456, 0.00017842, 0.00016943, 5.49E-05, 0.000110943, -0.000123014,
   0.000260278, -0.000880959, -0.500831152, 0.501051355, 0.000630071, -0.000215134,
   -6.65E-05, -1.52E-05, 2.20E-05, -0.000192981, 8.42E-05, -0.000225797}
Lo_R Level 4 = {0.000314076, 0.000154778, -0.000490818, -0.000185997, 0.000733671, 0.000863628,
   0.124866905, -0.127151197, -1.005194849, -1.00462816, -0.125855372, 0.125644792,
   -7.37E-05, -0.0003333, -0.000103239, 0.000104541, 0.00061522, 0.000348186}
Hi_R Level 5 = {0.000313183, 0.000139577, 8.43E-05, 0.000105725, 9.22E-05, 0.000383444,
   -0.000388136, 0.000464436, -0.499709193, 0.499480181, 0.000245732, -6.92E-05,
   -9.87E-05, 0.000166477, 0.00014635, -0.000109246, 3.27E-05, 2.77E-05}
Lo_R Level 5 = {-0.000649031, -0.000746771, -2.08E-05, 0.000418012, 5.72E-05, -0.000279407,
   0.124475598, -0.125170339, -0.998749858, -0.999303774, -0.125503234, 0.124638574,
   -0.00048029, -0.000449033, 2.88E-05, 0.000235518, -0.000750833, -0.000959176}

EVOLVED TRANSFORM FOR PROCESSING DATA

CROSS REFERENCE TO RELATED PATENT APPLICATION

This application claims priority to U.S. Provisional Application No. 61/944,241 filed Feb. 25, 2014, herein incorporated by reference in its entirety.

SUMMARY

It is to be understood that both the following general description and the following detailed description are exemplary and explanatory only and are not restrictive, as claimed. Provided are methods and systems for processing data. An example method can comprise receiving first data. A first transform can be applied to the first data. The first transform can be evolved from a second transform. The first transform can be based on first coefficients, and the second transform can be based on second coefficients. The first transform can be evolved without constraining a count of the first coefficients to be equal to a count of the second coefficients. The transformed first data can be provided (e.g., to a user, device).

In another aspect, an example method can comprise receiving information indicative of a first transform. The first transform can be based on first coefficients. Training data can be received. An evolved transform can be generated based on the information indicative of the first transform and the training data. The evolved transform can be based on second coefficients. The evolved transform can be evolved without constraining a count of the second coefficients to be equal to a count of the first coefficients.

In another aspect, an example system can comprise a memory having encoded thereon computer-executable instructions and data. The system can also comprise a processor functionally coupled to the memory and configured, by the computer-executable instructions, to perform at least the following actions: receiving first data, applying a first transform to the first data, and providing the transformed first data. The first transform can be evolved from a second transform. The first transform can be based on first coefficients and the second transform can be based on second coefficients. The first transform can be evolved without constraining a count of the first coefficients to be equal to a count of the second coefficients.

In another aspect, an example system can comprise a memory having encoded thereon computer-executable instructions and data. The system can comprise a processor functionally coupled to the memory and configured, by the computer-executable instructions, to perform at least the following actions: receiving information indicative of a first transform, receiving training data, and generating an evolved transform based on the information indicative of the first transform and the training data. The first transform can be based on first coefficients. The evolved transform can be based on second coefficients. The evolved transform can be evolved without constraining a count of the second coefficients to be equal to a count of the first coefficients.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 3 is a diagram illustrating example coefficients of an evolved transform;

DETAILED DESCRIPTION

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to generation and use of evolved transforms. For example, a transform can comprise a wavelet transform, randomly generated transform, or other transform. The transform can comprise one or more coefficients. The transform can be evolved such that the coefficients are optimized to minimize data loss for one or more processes, such as quantization, compression, and transmission of the data across the medium. The transform can be evolved without constraining the number of coefficients of the transform. For example, an evolved transform can comprise a different number of coefficients than the original transform on which the evolved transform is based. The present methods and systems can be applied to a reconstruction transform, decomposition transform, and/or the like.

Figure 1:
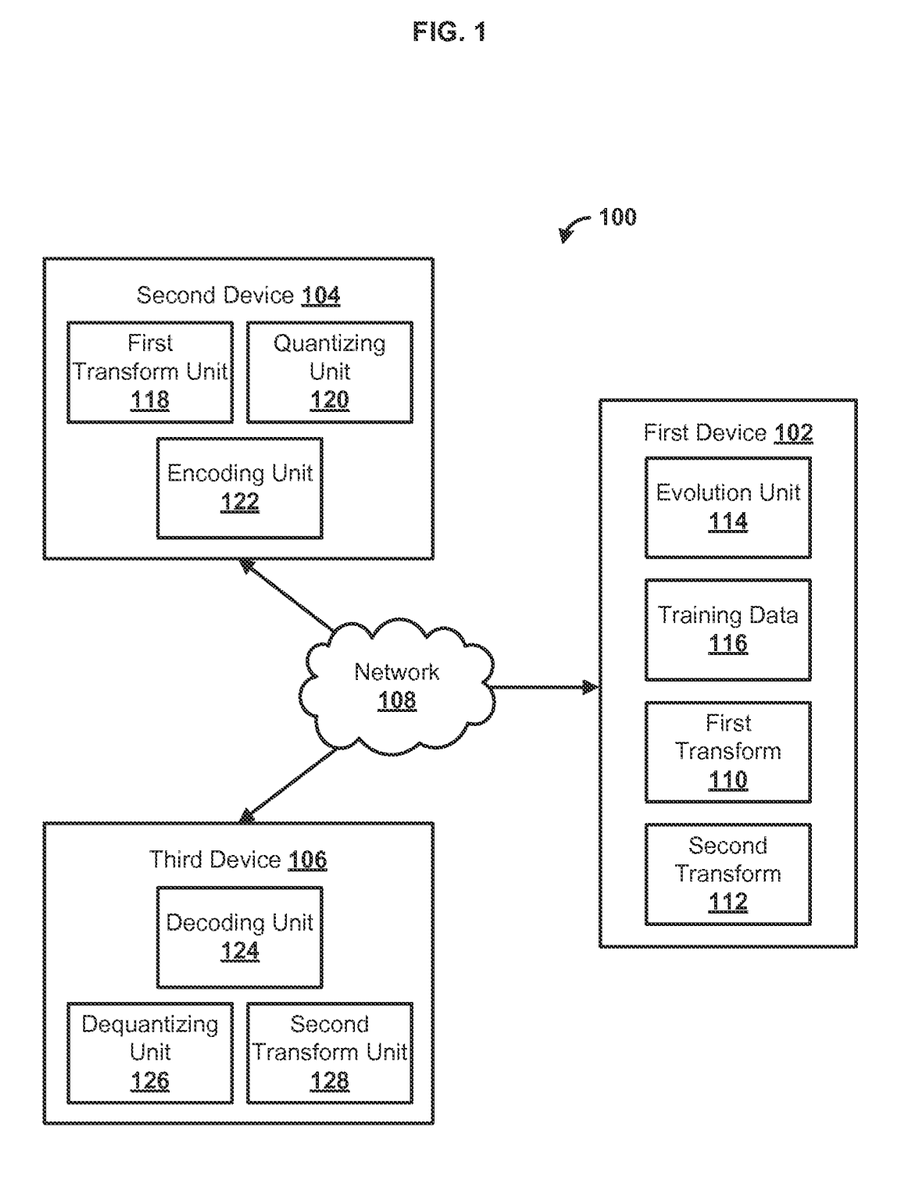
FIG. 1 is a block diagram illustrating various aspects of an exemplary system in which the present methods and systems can operate.

FIG. 1 is a block diagram illustrating various aspects of an exemplary system 100 in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

In one aspect, the system 100 can comprise a first device 102. The system 100 can comprise a second device 104. The system 100 can also comprise a third device 106. In one aspect, the first device 102, second device 104, and third device 106 can be communicatively coupled through a network 108. In one aspect, the network 108 can comprise a packet switched network (e.g., internet protocol based network), a non-packet switched network (e.g., quadrature amplitude modulation based network), and/or the like. The network 108 can comprise network adapters, switches, routers, modems, and the like connected through wireless links (e.g., radio frequency, satellite) and/or physical links (e.g., fiber optic cable, coaxial cable, Ethernet cable, or a combination thereof). In one aspect, the network 108 can be configured to provide communication from telephone, cellular, modem, and/or other electronic devices to and throughout the system 100.

In one aspect, the first device 102 can be configured to manage transform information. Transform information can comprise one or more transforms, such as a first transform 110, a second transform 112, and/or the like. An example transform can comprise an integral transform, discrete transform, discrete-time transform, data-dependent transform, and/or the like. As a further example, a transform can comprise a wavelet transform, randomly generated transform, and/or the like. A transform can comprise a reconstruction transform, a decomposition transform, and/or the like. A transform can comprise a multi-level transform. In one aspect, a transform can comprise one or more coefficients. For example, a multi-level transform can have different coefficients at each level of the transform. In one aspect, the number of coefficients at a level of the multi-level transform can be the same and/or different from the number of coefficients at a different level of the multi-level transform.

In one aspect, the first device 102 can comprise an evolution unit 114 configured to evolve one or more transforms. The evolution unit 114 can be configured to evolve a transform based on training data 116. The training data 116 can comprise a plurality of data objects, such as video data, image data, audio data, text, and/or the like. For example, the evolution unit 114 can be configured to evolve (e.g., modify) a transform to generate an evolved transform. For example, the first transform 110 can be evolved by the evolution unit 114 from the second transform 112. In one aspect, evolving a transform can comprise generating a plurality of evolved transforms. At least one (or each) of the plurality of evolved transforms can comprise new coefficients and/or coefficients modified from the coefficients of the original transform. In one aspect, the evolution unit 114 can be configured to generate new coefficients for an evolved transform without being constrained to use the same number of coefficients as the original transform. For example, an evolved transform (e.g., first transform 110) can have a different number (e.g., count) of coefficients than the number (e.g., count) of coefficients of the original transform (e.g., second transform 112). As another example, an evolved transform can have an arbitrary, random, and/or the like number of coefficients. As another example, the evolved transform can have a number of coefficients selected and/or provided by a user.

The evolution unit 114 can be configured to apply the plurality of transforms to the training data 116. The evolution unit 114 can evaluate the results of applying the evolved transforms to the training data 116. The evolution unit 114 can be configured to optimize the transforms to minimize data loss. For example, the evolution unit 114 can be configured to identify the amount of data loss caused by at least one (or each) of the evolved transforms when applied to the training data 116. In one aspect, the evolution unit 114 can save one or more of the evolved transforms. For example, the evolution unit 114 can store the evolved transforms that result in the least amount of data loss when applied to the training data 116. The evolution unit 114 can be configured to evolve transforms through a plurality of evolution cycles. For example, the evolution unit 114 can evolve a transform over the course of the plurality of evolution cycles. The evolution unit 114 can apply the evolved transforms of at least one (or each) evolution cycle to all or a portion of the training data 116. For example, different portions of the training data 116 can be used during different cycles. In one aspect, the evolution unit 114 can evolve a transform to optimize the transform to minimize data loss (e.g., for the training data 116) during one or more processes, such as quantization, dequantization, compression, decompression, transmission across one or more networks, encryption, decryption, and/or the like.

As previously referenced, the system 100 can comprise a second device 104. In one aspect, the second device 104 can be configured to provide data to other devices (e.g., third device 106) connected to the network 108. Example data can comprise video data, image data, audio data, text, and/or the like. For example, data can comprise signals that have a combination of low frequency data and high frequency data. Data can comprise medical data, such as electronic cardio gram (ECG) data, ultrasound data, hyperspectral data, pacemaker data, and/or the like. As another example, data can comprise biometric data, such as a fingerprint data. In one aspect, the second device 104 can comprise a first transform unit 118. The first transform unit 118 can be configured to apply a transform to the data. In one aspect, the first transform unit 118 can be configured to transform data. For example, the first transform unit 118 can receive data and apply one or more transforms to the data. The transform can be an evolved transform or other transform. For example, the transform can comprise the first transform 110 and/or second transform 112. As an illustration, the first transform unit 118 can be configured to receive a transform (e.g., first transform 110, second transform 112, and/or the like) from the first device 102.

In one aspect, the second device 104 can comprise a quantizing unit 120. The quantizing unit 120 can be configured to receive the transformed data from the first transform unit 118. The quantizing unit 120 can be configured to quantize the transformed data. For example, the quantizing unit 120 can be configured to segment data (e.g., a signal) into a finite number of quantized segments or bins. As another example, the quantizing unit 120 can be configured to represent data using a finite number of data values selected to be representative of the data.

In one aspect, the second device 104 can comprise an encoding unit 122 configured to receive the quantized data (e.g., transformed data that has been quantized) from the quantizing unit 120. In one aspect, the encoding unit 122 can compress, encrypt, or otherwise prepare the quantized data for transmission. For example, the encoding unit 122 can losslessly process (e.g., compress) the quantized data (e.g., by use of a lossless compression algorithm). In one aspect, the second device 104 can provide the encoded data (e.g., quantized data that has been encoded) to one or more devices across the network 108, such as the third device 106.

In one aspect, the third device 106 can be configured to receive data (e.g., video data, image data, audio data, text). For example, the third device 106 can be configured to receive data from the second device 104. For example, the third device 106 can receive the encoded data from the second device 104. In one aspect, the third device 106 can comprise a decoding unit 124. The decoding unit 124 can be configured to decode the encoded data. The decoding unit 124 can losslessly process (e.g., decompress) the encoded data (e.g., by use of a lossless decompression algorithm). For example, the decoding unit 124 can be configured to decompress, decrypt, or otherwise process the encoded data.

In one aspect, the third device 106 can comprise a dequantizing unit 126. The dequantizing unit 126 can be configured to receive the decoded data (e.g., encoded data that has been decoded) from the decoding unit 124. The dequantizing unit 126 can be configured to dequantize the decoded data. For example, the dequantizing unit 126 can be configured to process data that has been quantized, or represented by a finite number of selected values. The dequantizing unit 126 can be configured to process the quantized values to regenerate (e.g., usually with some data loss) the original data that was quantized (e.g., by the quantizing unit 120).

In one aspect, the third device 106 can comprise a second transform unit 128. The second transform unit 128 can be configured to receive the dequantized data (e.g., decoded data that has been dequantized). The second transform unit 128 can be configured to transform the dequantized data. For example, the second transform unit 128 can apply one or more transforms as described herein. As a further example, the second transform unit 128 can be configured to apply the first transform 110, second transform 112, and/or the like. As an illustration, the second transform unit 128 can be configured apply a reconstruction transform. For example, the first transform unit 118 can apply a decomposition transform (e.g., evolved or unevolved transform) to data. The second transform unit 128 can apply a corresponding reconstruction transform, an evolved reconstruction transform, and/or the like.

The present methods and systems are further illustrated through the following description. Wavelet-based lossy image compression schemes can use a variety of techniques to minimize mean squared error (MSE) in reconstructed images. In a typical scenario, raw digital images can first be subjected to a forward (compression) wavelet transform. The transformed image can then be quantized and encoded to achieve a desired amount of lossy compression. Subsequently, the compressed image can be decoded and dequantized before being processed by an inverse (e.g., reconstruction) wavelet transform to create a reconstructed image. The difference between this reconstructed image and the original can be caused by the lossy compression. It should be understood, that the term lossy compression as used herein can comprise the use of lossless compression algorithms and lossless decompression algorithms, but data loss may occur during other processing steps, such as during quantization and/or dequantization.

Wavelet transforms can be defined by two vectors of integer or floating-point numbers, referred to as wavelet numbers and scaling numbers. The coefficients of a transform can comprise the wavelet numbers and scaling numbers. For example, the integer 2/6 wavelet (e.g., Filter A) used by ICER image (a wavelet-based image compression file format) compressor developed at NASA's Jet Propulsion Laboratory for lossy compression and reconstruction of Mars Exploration Rover (MER) images can be defined as follows:

$LoD=[-½,½]$ $HiD=[-⅛,⅛,1,1,⅛,-⅛]$ $LoR=[-⅛,-⅛,1,-1,⅛,⅛]$ $HiR=[½,½]$

Here, LoD and HiD can represent the scaling numbers (low-pass) and wavelet numbers (high-pass) of the analysis signal defining the integer 2/6 wavelet's compression (forward) transform, respectively. LoR and HiR can be the corresponding values from the synthesis signal defining the integer 2/6 reconstruction transform (e.g., inverse transform). A single stage wavelet decomposition of a two-dimensional image with M rows and N columns can be performed by first applying the low-pass and high-pass filters to each row of the image, producing two subimages (designated L and H). These filters can then be applied to each column of L and H to produce four spatially filtered subimages (designated LL, LH, HL, and HH). The trend subimage LL can be essentially a ¼-size (M/2×N/2), lower-resolution version of the original image, while subimages LH, HL, and HH contain ¼-size horizontal, vertical, and diagonal fluctuations, respectively.

In one aspect, at least one (or each) level k of a multi-resolution analysis (MRA) transform can apply filters LoD and HiD to the trend subimage (LL) produced at level k−1. This process can compact most of the energy from the original image into increasingly smaller (e.g., and more easily compressible) trend subimages.

Figure 2:
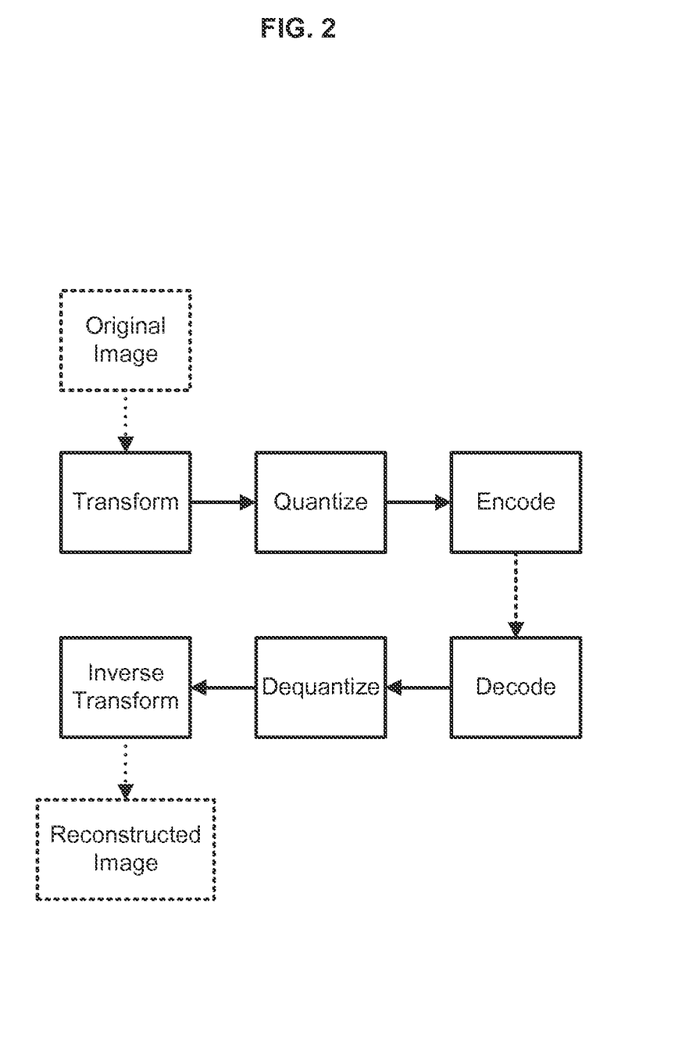
FIG. 2 is a diagram illustrating a process for transmitting data.

In one aspect, quantization is the process of representing a given signal using a relatively smaller number of bits. One form of quantization, uniform scalar quantization, can divide a signal's range of possible values into quantization "bins" of uniform width. In MATLAB, for example, 16:1 uniform scalar quantization of an integer signal divides the signal by 16 and rounds the result to the nearest integer. ICER can employ a uniform quantizer with a "dead zone" that maps all values below a selected threshold T to zero. Quantization can allow significantly greater compression than can be achieved using lossless techniques. Unfortunately, quantization can also introduce permanent and irreversible data loss, which can increase at higher quantization levels. A one-level wavelet-based lossy image compression and reconstruction system with quantization is illustrated in FIG. 2. In one aspect, the present methods and systems can use probabilistic methods or other non-probabilistic methods for quantization.

In one aspect, the present methods and systems can use evolutionary computing to optimize inverse transforms defined by two vectors of an arbitrary number of floating-point values. In the example below, there are 18 floating-point values (e.g., coefficients) in each vector. It should be noted however, that 18 is merely an example and other numbers of coefficients can be used. The evolved transforms of the present methods and system can be optimized to outperform wavelet inverse transforms for lossy image reconstruction according to at least one of the following techniques: (1) the evolved transform can be used to reduce the MSE in reconstructed images previously subjected to the same amount of lossy wavelet-based compression; or (2) the evolved transform can be used to reconstruct images that had previously been subjected to a greater amount of lossy wavelet-based compression, without introducing additional MSE.

The present methods and systems were successfully demonstrated using images transmitted by MERs Spirit and Opportunity, robot rovers exploring the planet Mars. MERs used the ICER compressor exclusively for lossy image compression, typically employing five levels of MRA decomposition. To establish a baseline, a representative training set of 150 losslessly transmitted Mars images were subjected to a lossy image compression and reconstruction scheme commonly used by MERs: specifically, a five-level MRA compression transform, quantization, encoding were performed followed by decoding, dequantization, a five-level MRA reconstruction transform. Then, the MSE in reconstructed images was measured relative to the original training set.

As a further illustration, to demonstrate technique (1) from above, a five-level 18/18 MRA reconstruction transform was evolved. The wavelet numbers (e.g., designated by Hi_R) and scaling numbers (e.g., designated by Lo_R) of the evolved transform are shown in FIG. 3. Note that the evolved transform has a different number of scaling and wavelet numbers (e.g., a different wavelet shape) than the wavelet from which the evolved transform has been evolved. In this example, instead of the wavelet inverse transform's 6 scaling numbers and 2 wavelet numbers, the evolved transform has 18 scaling numbers and 18 wavelet numbers (18/18), each of which is a floating-point value. It should be noted that the evolved transforms coefficients are not limited to floating-point values. Also it should be noted that, unlike a wavelet transform, the evolved transform can have different wavelet numbers and scaling numbers at each MRA level (e.g., a five-level 18/18 transform can be defined by 180 different floating-point values). The evolved transform was trained on images previously compressed, quantized, encoded, decoded, and dequantized by ICER software (e.g., using Filter A, Filter B, and/or another ICER filter) at 1.00 bpp (e.g., the same amount of lossy compression as was used to establish a baseline). As an illustration, an evolved transform was able to reduce the MSE in reconstructed images by an average of 7.76% in comparison to the baseline described above. In one aspect, the present methods and systems can allow an organization, such as NASA, to go back through NASA's entire library of images previously subjected to lossy compression and reconstruct these images with less MSE, thus potentially improving the value of these images.

As another illustration, to demonstrate technique (1) from above, the experiment was repeated using ICER's compression transform (e.g., Filter A), quantization, encoding, decoding, and dequantization software. Then the images from the training set were subjected to a greater amount of compression. For example, instead of compressing the images at 1.00 bits-per-pixel (bpp), the images were compressed at a 0.936 bpp rate, reducing the compressed file sizes by 6.4%. Instead of using ICER's inverse wavelet transform to reconstruct these images, however, another evolved 18/18 five-level MRA reconstruction transform was applied to the images. For example, the evolved reconstruction transform had different wavelet and scaling numbers than the transform evolved to demonstrate technique (1). This evolved transform was configured to reconstruct images compressed at 0.936 bpp. The evolved transform demonstrated 99.99% (e.g., ever so slightly less) MSE, averaged across 150 test images in comparison to the MSE that ICER (e.g., Filter B) introduced to images compressed at 1.00 bpp. In another aspect, the present methods and systems will thus allow future missions to send a larger number of images over severely bandwidth-limited deep space communication channels without sacrificing image quality.

In one aspect, the specific results reported above were achieved using 1024×1024-pixel MER images with 4096 possible grayscale values (12 bbp). However, the techniques described in this patent application are not limited to images of this size or resolution.

In one aspect, an advantage of the approach described herein is that the present methods and systems can be used with any existing wavelet-based lossy compression scheme. Signals can be compressed at lower bit rates without reducing the quality of the reconstructed signal and/or signals can be compressed at the same bit rates with less error in the reconstructed signal.

Lossy compression can be used in MP3 audio signals, JPEG 2000 images, FBI fingerprint images, satellite images, medical images, multispectral images, hyperspectral images, and/or the like. By reducing error in reconstructed signals, the present methods and systems (e.g., technique (1)) can improve the quality of those signals without requiring additional bandwidth. By allowing signals to be compressed at lower bit rates without negatively impacting the quality of the corresponding reconstructed signals, the present methods and systems (e.g., technique (2)) can significantly reduce signal storage and transmission costs.

The present methods and systems can be applied to a diverse range of potential beneficiaries, including hospitals, clinics, and doctors; audio and video retailers; defense organizations and contractors; space organizations and contractors; law enforcement organizations; internet service providers; cell phone data, photos, and video; any organization with a large archive of lossy-compressed images; and any organization seeking to reduce its lossy image storage and transmission costs.

Figure 4:
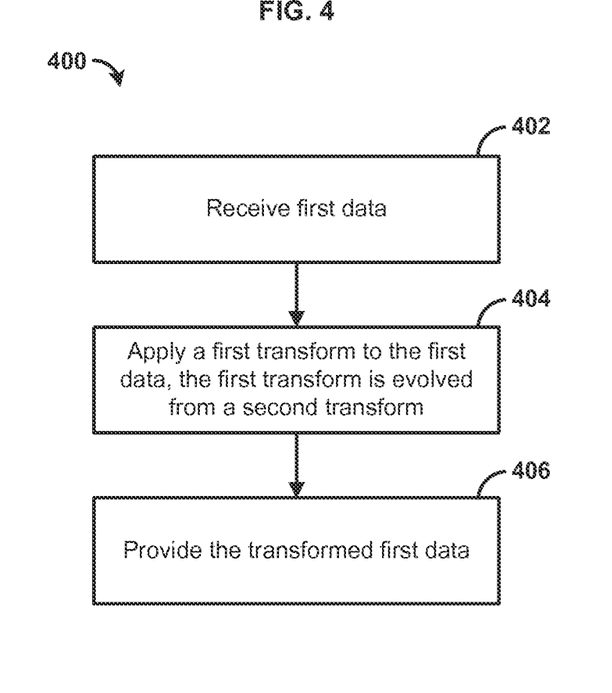
FIG. 4 is a flowchart illustrating an example method for processing data.

FIG. 4 is a flowchart illustrating an example method 400 for processing data. At step 402, first data can be received. The first data can comprise at least one of video data, image data, audio data, text and/or other data. For example, the first data can comprise signals that have a combination of low frequency data and high frequency data. The first data can comprise medical data, such as electronic cardio gram (ECG) data, ultrasound data, hyperspectral data, pacemaker data, and/or the like. As another example, the first data can comprise biometric data, such as a fingerprint data. In one aspect, step 402 can comprise receiving second data, decompressing (e.g., losslessly) the second data to generate third data, dequantizing the third data to generate the first data, and/or the like.

At step 404, a first transform can be applied to the first data. The first transform can be evolved from a second transform. The first transform can be based on first coefficients. The second transform can be based on second coefficients. The first transform can be evolved without constraining a count (e.g., of the total number) of the first coefficients to be equal to a count (e.g., of the total number) of the second coefficients. For example, the count of the first coefficients can be different than the count of the second coefficients. As another example, the count of the first coefficients can be specified by a user. As a further example, the count of the first coefficients can be a random or arbitrary number. The first transform can be evolved from the second transform based on training data. For example, training data can comprise a plurality of data objects. The first transform can be evolved from the second transform by modifying the second coefficients such that the second transform is optimized, based on the plurality of data objects, to minimize (e.g., prevent) data loss. For example, the first transform can be optimized to minimize data loss to the data objects when the data objects are subject to one or more processes, such as quantization, dequantization, compression, decompression, transmission across one or more networks, encryption, decryption, and/or the like.

The first transform and/or the second transform can comprise a wavelet transform, such as a discrete wavelet transform. As a non-limiting illustration, an example wavelet transform is described as follows. A discrete wavelet transform can comprise a mathematical operation that decomposes a discrete signal f into two subsignals of half the signal's length. These subsignals can be known as trend (e.g., running average) and fluctuation (e.g., running difference) subsignals, which may be designated as a and d, respectively. Each trend subsignal $a_m$ can be computed by the scalar product $f*V^1_m$, where $V^1_m$ is a one-level scaling signal. Likewise, each fluctuation subsignal $d_m$ can be computed by the scalar product $f*W^1_m$ where $W^1_m$ is a one-level wavelet. Each scaling and wavelet transform can be defined by a unique set of scaling and wavelet numbers as understood by those of ordinary skill in the art.

The first transform and/or the second transform can comprise one or more multi-level transforms. For example, a multilevel transform can be an m-level transform for which the transform at level k is applied to the trend subimage (LL) produced by the level k−1 transform, where $2<=k<=m$. In one aspect, the first coefficients can vary between levels of the first transform. The first transform and/or the second transform can comprise a reconstruction transform and/or decomposition transform. As an illustration, the second transform can comprise a wavelet transform. The first transform can be evolved from the second transform without retaining one or more features common to wavelet transforms (e.g., or other type and/or category of transform to which the second transform belongs). As another example, the first transform and/or second transform can comprise any kind of transform, such as a known transform, a randomly generated transform, a discrete cosine transform, and/or the like. For example, a randomly generated transform can be a transform comprising one or more randomly generated coefficients.

In one aspect, the first transform can be associated with (e.g., can cause at least in part) a first error measurement in transforming the first data. The second transform can be associated with (e.g., can cause at least in part) a second error measurement in transforming the first data. The first error measurement can be less than the second error measurement. The first error measurement and/or the second error measurement can comprise a means squared error, universal quality index, structural similarity measure, and/or the like.

At step 406, the transformed first data can be provided. In one aspect, step 406 can comprise quantizing the transformed first data to generate second data, compressing (e.g., losslessly) the second data to generate third data, transmitting the third data, and/or the like. In another aspect, the transformed first data can be provided to a user on a local and/or remote device. The transformed first data can be provided across a network, to a storage medium (e.g., CD-ROM, flash drive, hard drive, DNA storage, spintronic storage, quantum bits storage), and/or the like. The local and/or remote device can be configured to apply a corresponding transform (e.g., corresponding decomposition or reconstruction transform). For example, the local and/or remote device can decompress (e.g., losslessly) the received copy of the third data and dequantize the decompressed third data. Then, the local and/or remote device can apply the corresponding transform to the decompressed dequantized third data.

Figure 5:
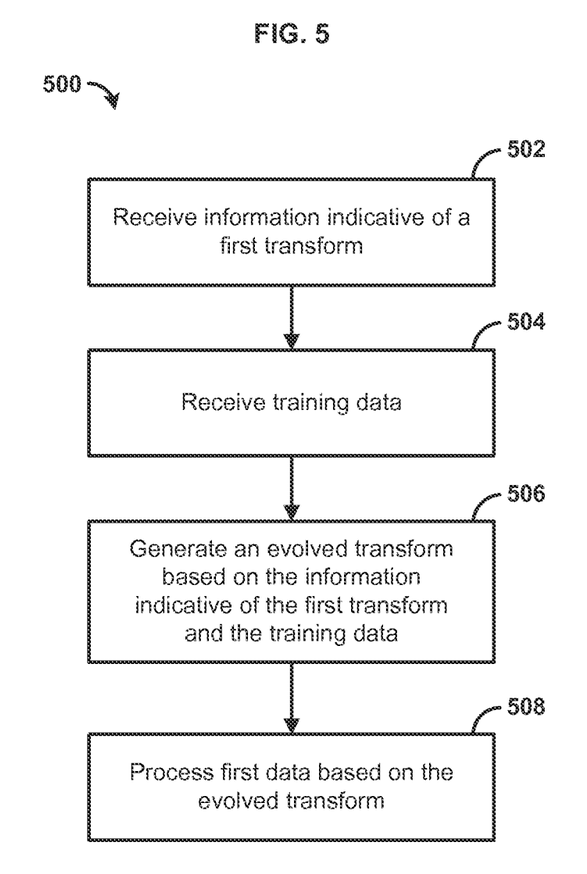
FIG. 5 is a flowchart illustrating an another example method for processing data.

FIG. 5 is a flowchart illustrating another example method 500 for processing data. At step 502, information indicative of a first transform can be received. The first transform can be based on first coefficients. The information indicative of the first transform can comprise the first coefficients, mathematical formulae, computer readable code configured to apply a transform, and/or the like.

At step 504, training data can be received. The training data can comprise, for example, a plurality of data objects, such as video, images, audio, text, and/or the like. The training data can be selected based on a target data type, image type, and/or the like. For example, a user may desire to use a transform (e.g., evolved transform of step 506) to process additional data from a certain device, obtained from a certain location, having certain characteristics. The training data can comprise features similar to the additional data.

At step 506, an evolved transform can be generated based on the information indicative of the first transform and the training data. The evolved transform can be based on (e.g., comprise) second coefficients. In one aspect, the evolved transform can be evolved without constraining a count (e.g., total count, total number) of the second coefficients to be equal to a count (e.g., total count, total number) of the first coefficients. For example, the count of the first coefficients can be different than the count of the second coefficients. As another example, the count of the second coefficients can be specified by a user. As a further example, the count of the second coefficients can be a random, arbitrary number, and/or the like (e.g. selected by a training program). In one aspect, generating the evolved transform based on the information indicative of the first transform and the training data can comprise modifying the first coefficients such that the first transform is optimized, based on the training data, to minimize (e.g., prevent) data loss. For example, the first transform can be optimized to minimize data loss to the data objects when the data objects are subject to one or more processes, such as quantization, dequantization, compression, decompression, transmission across one or more networks, encryption, decryption, and/or the like.

In an aspect, the evolved transform can be generated by a training program. The training program can be configured to generate a plurality of evolved transforms (e.g., coefficients of the transforms) during each of one or more iteration. The training program can optimize the first transform by selecting the transform (e.g., corresponding coefficients) that minimizes the data loss associated with applying the one or more processes to the data objects.

The first transform can comprise a wavelet transform, such as a discrete wavelet transform. As a non-limiting illustration, an example wavelet transform is described as follows. A discrete wavelet transform can comprise a mathematical operation that decomposes a discrete signal f into two subsignals of half the signal's length. These subsignals can be known as trend (e.g., running average) and fluctuation (e.g., running difference) subsignals, which may be designated as a and d, respectively. Each trend subsignal $a_m$ can be computed by the scalar product $f*V^1_m$, where $V^1_m$ is a one-level scaling signal. Likewise, each fluctuation subsignal $d_m$ can be computed by the scalar product $f*W^1_m$ where $W^1_m$ is a one-level wavelet. Each scaling and wavelet transform can be defined by a unique set of scaling and wavelet numbers as understood by those of ordinary skill in the art.

The first transform and/or the evolved transform can comprise one or more multi-level transforms. For example, a multilevel transform can be an m-level transform for which the transform at level k is applied to the trend subimage (LL) produced by the level k−1 transform, where 2<=k<=m. In one aspect, the second coefficients can vary between levels of the evolved transform. The evolved transform and/or first transform can comprise a reconstruction transform, decomposition transform, and/or the like. As an illustration, the first transform can comprise a wavelet transform. The evolved transform can be evolved from the first transform without retaining one or more features common to wavelet transforms (e.g., or other type and/or category of transform to which the first transform belongs). As another example, the first transform and/or evolved transform can comprise any kind of transform, such as a known transform, a randomly generated transform, a discrete cosine transform, and/or the like. For example, a randomly generated transform can be a transform comprising one or more randomly generated coefficients.

In one aspect, the evolved transform can be associated with (e.g., can cause at least in part) a first error measurement in transforming data. The first transform can be associated with (e.g., can cause at least in part) a second error measurement in transforming the data. The first error measurement can be less than the second error measurement. In one aspect, the first error measurement and/or second error measurement can comprise a means squared error.

At step 508, first data can be processed based on the evolved transform. For example, the evolved transform can be applied to first data. In one aspect, the first data can comprise at least one of video, image data, audio data, text data, and/or the like. For example, first data can comprise signals that have a combination of low frequency data and high frequency data. First data can comprise medical data, such as electronic cardio gram (ECG) data, ultrasound data, hyperspectral data, pacemaker data, and/or the like. As another example, first data can comprise biometric data, such as a fingerprint data. As an illustration, the evolved transform can be applied after receiving second data, decompressing (e.g., losslessly the second data to generate third data, dequantizing the third data to generate the first data, and/or the like. As another example, after the evolved transform is applied, the transformed first data can be quantized to generate second data, the second data to can be compressed (e.g., losslessly) to generate third data, the third data can be transmitted, and/or the like. FIG. 2 further illustrates an example of processing the first data based on an evolved transform.

Figure 6:
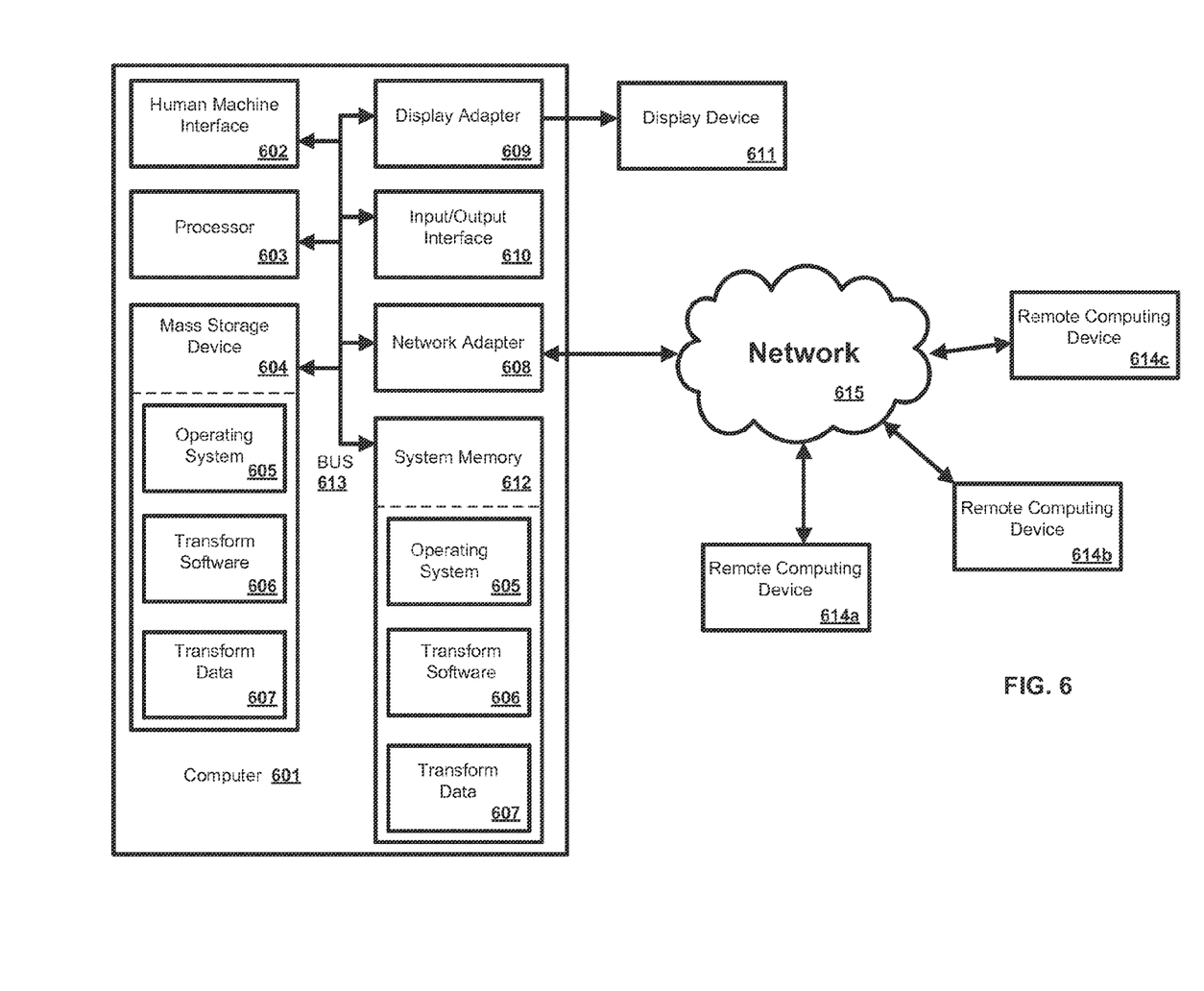
FIG. 6 is a block diagram illustrating an example computing system in which the present methods and systems can operate.

In an exemplary aspect, the methods and systems can be implemented on a computer 601 as illustrated in FIG. 6 and described below. By way of example, first device 102, second device 104, and/or third device 106 of FIG. 1 can be a computer as illustrated in FIG. 6. Similarly, the methods and systems disclosed can utilize one or more computers to perform one or more functions in one or more locations. FIG. 6 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 601. The components of the computer 601 can comprise, but are not limited to, one or more processors or processing units 603, a system memory 612, and a system bus 613 that couples various system components including the processor 603 to the system memory 612. In an aspect, the system can utilize parallel computing, quantum computing, and/or the like.

The system bus 613 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description can also be implemented over a wired or wireless network connection and each of the subsystems, including the processor 603, a mass storage device 604, an operating system 605, transform software 606, transform data 607, a network adapter 608, system memory 612, an Input/Output Interface 610, a display adapter 609, a display device 611, and a human machine interface 602, can be contained within one or more remote computing devices 614a,b,c at physically separate locations, connected through buses of this form, in effect implementing a fully distributed system.

The computer 601 typically comprises a variety of computer readable media. Exemplary readable media can be any available media that is accessible by the computer 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as transform data 607 and/or program modules such as operating system 605 and transform software 606 that are immediately accessible to and/or are presently operated on by the processing unit 603.

In another aspect, the computer 601 can also comprise other removable/non-removable, volatile/non-volatile computer storage media. By way of example, FIG. 6 illustrates a mass storage device 604 which can provide non-volatile storage of computer code, computer readable instructions, data structures, program modules, and other data for the computer 601. For example and not meant to be limiting, a mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, an operating system 605 and transform software 606. Each of the operating system 605 and transform software 606 (or some combination thereof) can comprise elements of the programming and the transform software 606. Transform data 607 can also be stored on the mass storage device 604. Transform data 607 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 601 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 603 via a human machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another aspect, a display device 611 can also be connected to the system bus 613 via an interface, such as a display adapter 609. It is contemplated that the computer 601 can have more than one display adapter 609 and the computer 601 can have more than one display device 611. For example, a display device can be a monitor, an LCD (Liquid Crystal Display), or a projector. In addition to the display device 611, other output peripheral devices can comprise components such as speakers (not shown) and a printer (not shown) which can be connected to the computer 601 via Input/Output Interface 610. Any step and/or result of the methods can be output in any form to an output device. Such output can be any form of visual representation, including, but not limited to, textual, graphical, animation, audio, tactile, and the like. The display 611 and computer 601 can be part of one device, or separate devices.

The computer 601 can operate in a networked environment using logical connections to one or more remote computing devices 614a,b,c. By way of example, a remote computing device can be a personal computer, portable computer, smartphone, a server, a router, a network computer, a peer device or other common network node, and so on. Logical connections between the computer 601 and a remote computing device 614a,b,c can be made via a network 615, such as a local area network (LAN) and/or a general wide area network (WAN). Such network connections can be through a network adapter 608. A network adapter 608 can be implemented in both wired and wireless environments. Such networking environments are conventional and commonplace in dwellings, offices, enterprise-wide computer networks, intranets, and the Internet.

For purposes of illustration, application programs and other executable program components such as the operating system 605 are illustrated herein as discrete blocks, although it is recognized that such programs and components reside at various times in different storage components of the computing device 601, and are executed by the data processor(s) of the computer. An implementation of transform software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
receiving first data comprising one or more data objects;
applying a first transform to the first data, wherein the first transform is evolved from a second transform based on training data, and wherein the first transform is based on first coefficients and the second transform is based on second coefficients, wherein the first transform is evolved without constraining a count of the first coefficients to be equal to a count of the second coefficients, and wherein at least one of the first transform or the second transform minimizes data loss of the one or more data objects; and
providing the transformed first data.

2. The method of claim 1, wherein the count of the first coefficients is different than the count of the second coefficients.

3. The method of claim 1, wherein the second transform is a wavelet transform.

4. The method of claim 1, wherein the first transform and the second transform are multi-level transforms.

5. The method of claim 4, wherein the first coefficients vary between levels of the first transform.

6. The method of claim 1, wherein the training data comprises a plurality of training data objects, and wherein the first transform is evolved from the second transform by modifying the second coefficients such that the second transform is optimized, based on the plurality of training data objects, to minimize data loss.

7. The method of claim 1, wherein the first transform is a reconstruction transform.

8. The method of claim 1, wherein the first transform is a decomposition transform.

9. The method of claim 1, wherein the first transform is associated with a first error measurement in transforming the first data and the second transform is associated with a second error measurement in transforming the first data, and wherein the first error measurement is less than the second error measurement.

10. A method, comprising:
receiving information indicative of a first transform, wherein the first transform is based on first coefficients;
receiving training data comprising one or more training data objects; and
generating an evolved transform based on the information indicative of the first transform and the training data, wherein the evolved transform is based on second coefficients, wherein the evolved transform is evolved without constraining a count of the second coefficients to be equal to a count of the first coefficients, and wherein at least one of the first transform or the evolved transform minimizes data loss.

11. The method of claim 10, wherein the count of the first coefficients is different than the count of the second coefficients.

12. The method of claim 10, wherein generating the evolved transform based on the information indicative of the first transform and the training data comprises modifying the first coefficients such that the first transform is optimized, based on the training data, to minimize data loss.

13. The method of claim 10, wherein the information indicative of the first transform comprises the first coefficients.

14. The method of claim 10, wherein the first transform is a wavelet transform.

15. The method of claim 10, wherein the first transform and the evolved transform are multi-level transforms.

16. The method of claim 15, wherein the second coefficients vary between levels of the evolved transform.

17. The method of claim 10, wherein the evolved transform is a reconstruction transform.

18. The method of claim 10, wherein the evolved transform is a decomposition transform.

19. The method of claim 10, wherein the evolved transform is associated with a first error measurement in transforming data and the first transform is associated with a second error measurement in transforming the data, and wherein the first error measurement is less than the second error measurement.

20. A system, comprising:
a memory having encoded thereon computer-executable instructions and data; and
a processor functionally coupled to the memory and configured, by the computer-executable instructions, to perform at least the following actions,
receiving information indicative of a first transform, wherein the first transform is based on first coefficients,
receiving training data comprising one or more training data objects, and
generating an evolved transform based on the information indicative of the first transform and the training data, wherein the evolved transform is based on second coefficients, wherein the evolved transform is evolved without constraining a count of the second coefficients to be equal to a count of the first coefficients, and wherein at least one of the first transform or the evolved transform minimizes data loss.

* * * * *